B. Densmore,
Pump Brake.
No. 106,791.   Patented Aug. 30, 1870.
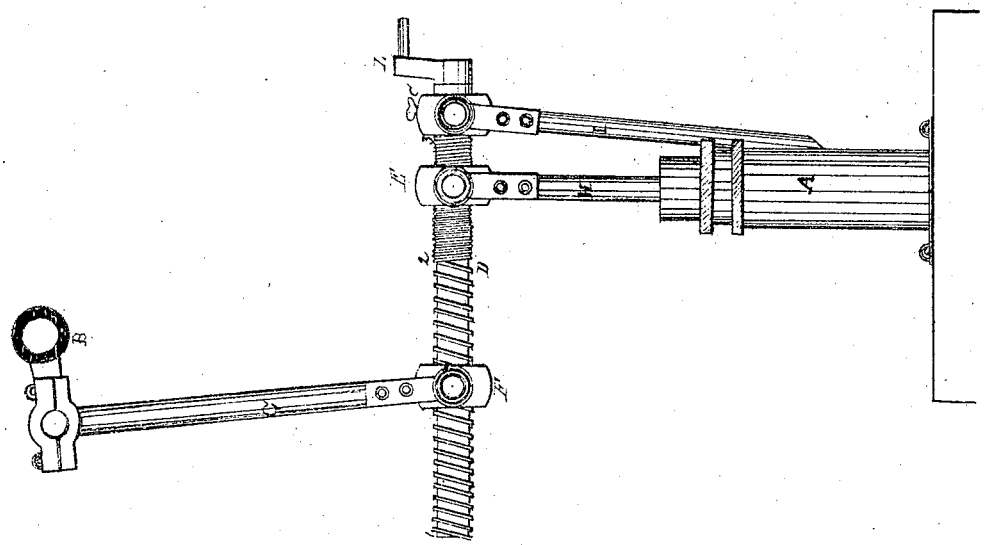

United States Patent Office.

BYRON DENSMORE, OF NEW YORK, N. Y.

Letters Patent No. 106,791, dated August 30, 1870; antedated August 24, 1870.

IMPROVEMENT IN ADJUSTMENTS FOR PUMP-RODS.

The Schedule referred to in these Letters Patent and making part of the same.

I, BYRON DENSMORE, of the city of New York, in the State of New York, have invented certain Improvements in Adjustable Attachments for Varying the Stroke of Feed-Pumps for Steam-Boilers, and for other purposes, of which the following is a specification.

Description of the Accompanying Drawing.

Figure 1 shows the whole machine.

A is the pump.
B is the crank that drives it.
C is the fulcrum of the lever D, so attached that the lever revolves on it.
E and F are screw-nuts, working on the lever D.
These nuts and the fulcrum C have journals on each end, working in boxes attached to the connecting-rods G, H, and I.
The lever D is screwed its whole length. From 1 to 2 it is a left-hand screw, of coarse lead. From 2 to 3 it is right-hand, and has a fine lead; or the leads of both may be alike.

The nuts E and F come together at 2. Then the pump has its full stroke.

To reduce the stroke, turn the lever D with the crank L, so that the nuts E and F go apart, and, while E is traveling to 3, F will go to 1. Then the pump has its shortest stroke.

I claim as my invention—

The lever D, in combination with the attachments E, F, and C, arranged and operated as specified, for varying motions.

BYRON DENSMORE.

Witnesses:
    MARY E. DENSMORE,
    ABRAHAM ODELL.